March 1, 1927.
W. F. SCHOENWEITZ
1,619,159
COOKING UTENSIL
Filed May 26, 1926
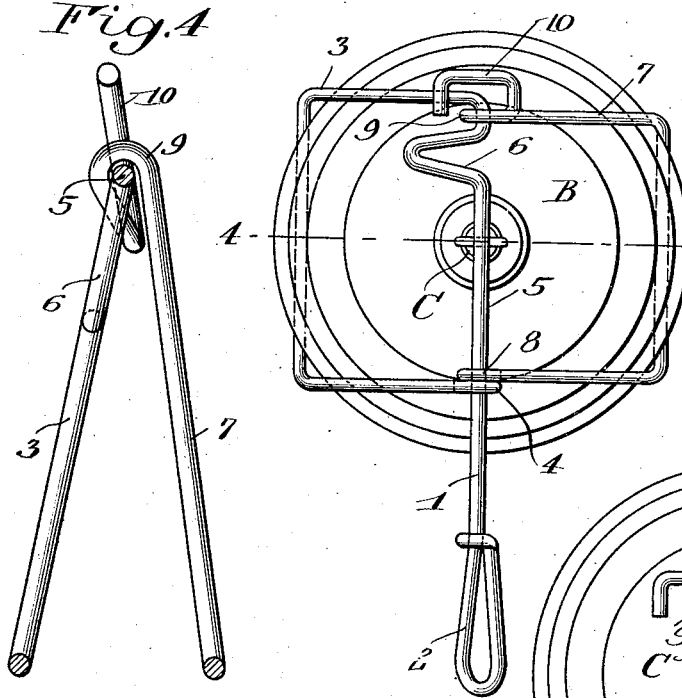
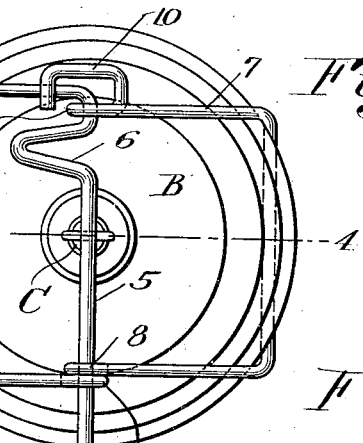
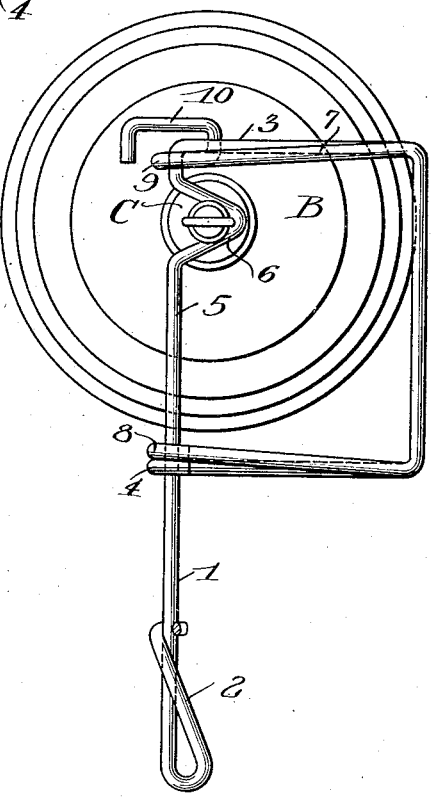
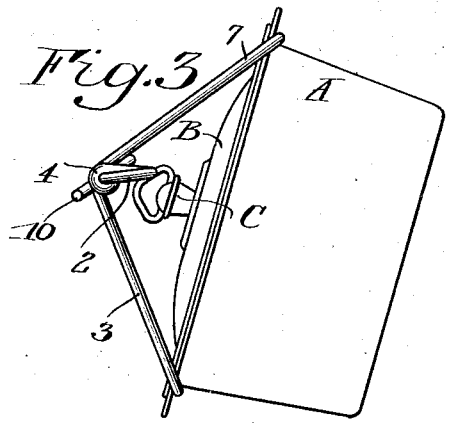
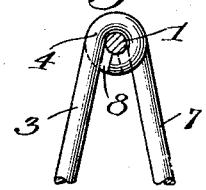
INVENTOR
William F. Schoenweitz
BY
his ATTORNEYS Patented Mar. 1, 1927.

1,619,159

UNITED STATES PATENT OFFICE.

WILLIAM F. SCHOENWEITZ, OF ROCHESTER, NEW YORK.

COOKING UTENSIL.

Application filed May 26, 1926. Serial No. 111,748.

My present invention relates to culinary devices and more particularly to implements used in the kitchen, on camp fires or other places where cooking is done for the purpose of handling hot pots and pans. The invention has for its object to provide a simple, cheap and serviceable article of this nature, that will have a wide range of use and can be employed itself as a cooking utensil aside from its adaptability to handle or lift other utensils.

To these and other ends the invention resides in certain improvements and combinations of parts, all as will be hereinafter more fully described, the novel features being pointed out in the claims at the end of the specification.

In the drawings:—

Figure 1 is a top view of a device constructed in accordance with and illustrating one embodiment of my invention showing its adaptability to lift and transport a pot, pan or plate, having a flanged or overhanging edge;

Figure 2 is a similar view showing a different disposition of the parts of the device by which it becomes available for the purpose of applying or removing the lid of a pot or pan;

Figure 3 is an end view showing how the device is used in draining or emptying the liquid contents of a pan;

Figure 4 is an enlarged section taken on the line 4—4 of Figure 1; and

Figure 5 is an enlarged fragmentary section showing in detail a hinged connection between the parts.

Similar reference numerals throughout the several views indicate the same parts.

My device is in the nature of a pair of jaws or bails adapted to engage the pan and having a projecting handle of sufficient length to prevent the hand of the operator from becoming burned. I contemplate constructing the article entirely of bent wire to reduce its cost and in the present embodiment I have shown a construction of this kind. Referring more particularly to the drawings 1 indicates a central handle or supporting portion made of round wire having one end looped to form a hand grip 2. From the handle the wire proceeds in the form of what may be termed a fixed rectangular jaw 3, the far end being provided with an eye 4 encircling and clamped to the handle portion. A straight extension of the handle proceeds centrally of the device as at 5 and is provided at an intermediate point with a wedge-shape open loop indicated at 6 and the purpose of which will be hereinafter explained.

Pivoted to the so-called fixed jaw 3 is a pivoted jaw 7 of approximately the same shape, also made of round wire and swinging freely on the fixed jaw. Its bearings are supplied by an eye 8 at one end encircling the central portion 5 adjacent to the eye 4 and by an eye 9 near the other end encircling the central portion beyond the loop 6. From the eye 9 the wire material is extended to form a hook 10, the end of which is turned back inwardly to cross the adjacent arm of the fixed frame 3 as clearly shown in Figure 1.

The implement is operated as follows: When held in the hand by means of the grip 2 the pivoted jaw 7 falls by gravity to a position substantially parallel with the fixed jaw 3, which is the position of Figure 4. When it is desired to lift a pot, pan, pie plate or similar vessel, having a bead or flange at its edge, the swinging jaw 7 is engaged under such projecting portion at one side and then the opposite jaw 3 is brought down to engage in a similar manner on the opposite side as shown in Figure 1. A subsequent lifting movement holds the jaws engaged and the greater the weight of the vessel the more tightly they so engage. By twisting the supporting handle in the direction of the fixed jaw, the pan or vessel may be tilted as shown in Figure 3 for the purpose of draining its contents. During this operation the device holds the cover tightly in place. In the figures the vessel is indicated at A and the cover at B.

If it is desired to remove the cover B, the device may be turned as shown in Figure 2, so that the pivoted jaw rests horizontally on the fixed jaw exposing the throat of the open loop 6 on the central portion 5. This loop may then be slid under the knob C of the cover and engaged therewith so securely as to permit it to be lifted.

Should a vessel or the cover thereof be provided with a bail or handle instead of a knob, it can be lifted by holding the device in the position of Figure 2 and using the hook 10, which is then exposed for such engagement.

Another function of the hook 10 is to act as a stop engaging an arm of the fixed jaw 3 to hold the two jaws in a flat horizontal position, that is, in the same plane when completely reversed or turned over. In such an instance, the utensil may be used as a broiler or for supporting any article requiring a flat surface and which it is desired to lift or transport.

When the device is spread to the maximum from the position of Figure 4 it may be used as a grill over a campfire, for instance, the jaws resting on oppositely arranged stones and the hook 10 again acting as a stop to prevent the grill so formed from collapsing.

There are many other uses and adaptations of the device that will occur to one who starts its manipulation about a stove or campfire.

What I claim as my invention is:—

1. In an article of the character described, the combination with a fixed jaw having a handle portion thereon extended to form a central portion having an open loop adapted to engage beneath the knob of a covered vessel, of a swinging jaw pivoted to the central portion of the fixed jaw to straddle the loop and adapted to rest upon the fixed jaw and expose the loop for engagement.

2. In an article of the character described, the combination with a fixed jaw having a handle portion and having the form of an open frame, of a swinging jaw pivoted to the fixed jaw and provided with a hook projecting from one end of the device and adapted to be engaged for lifting purposes when the jaws are closed together, said hook also being adapted to engage the fixed jaw as a stop to hold the jaws spread and provide a flat support.

3. In an article of the character described, the combination with a fixed jaw formed of bent wire into a rectangular frame having a central portion and a handle portion extended from the latter, of a swinging jaw also formed of wire bent into rectangular shape and having eyes at its ends by which it is pivotally supported upon the central portion of the fixed jaw, one of said eyes being extended to form a hook projecting from the device as a whole at the side opposite to the handle and in alinement with the latter.

WILLIAM F. SCHOENWEITZ.